(12) United States Patent
Netravali et al.

(10) Patent No.: US 8,557,367 B2
(45) Date of Patent: Oct. 15, 2013

(54) HIGH-STRENGTH, ENVIRONMENTALLY FRIENDLY CORRUGATED BOARD

(75) Inventors: Anil Netravali, Ithaca, NY (US); Patrick Govang, Ithaca, NY (US)

(73) Assignees: Cornell University, Ithaca, NY (US); e2e Materials, Inc., Ithaca, NY (US)

( * ) Notice: Subject to any disclaimer, the term of this patent is extended or adjusted under 35 U.S.C. 154(b) by 448 days.

(21) Appl. No.: 12/809,067

(22) PCT Filed: Dec. 17, 2008

(86) PCT No.: PCT/US2008/087224
§ 371 (c)(1),
(2), (4) Date: Oct. 27, 2010

(87) PCT Pub. No.: WO2009/079579
PCT Pub. Date: Jun. 25, 2009

(65) Prior Publication Data
US 2011/0052881 A1    Mar. 3, 2011

Related U.S. Application Data

(60) Provisional application No. 61/014,205, filed on Dec. 17, 2007.

(51) Int. Cl.
*B32B 3/28* (2006.01)
*B32B 3/30* (2006.01)

(52) U.S. Cl.
USPC ................. 428/178; 428/182; 428/186

(58) Field of Classification Search
USPC ............... 428/178, 181, 182, 186; 52/783.1, 52/783.11, 783.17, 783.19
See application file for complete search history.

*Primary Examiner* — Catherine A Simone
(74) *Attorney, Agent, or Firm* — Paul T. Lavoie, Esq.

(57) ABSTRACT

The present invention includes a high-strength, light-weight corrugated board. The board comprises a first sheet made of a soy protein based resin and one or more sheets of plant-based fibers. The first sheet is connected to a corrugated member. In one aspect of the present invention, there is a method of manufacturing a high-strength, corrugated board.

12 Claims, 4 Drawing Sheets

HIGH-STRENGTH, ENVIRONMENTALLY FRIENDLY CORRUGATED BOARD

CROSS REFERENCE TO RELATED APPLICATIONS

This application claims the benefit of U.S. Provisional 61/014,205 filed Dec. 17, 2007, which is incorporated herein by reference.

FIELD OF THE INVENTION

The present invention, generally, relates to corrugated boards that are biodegradable and free of formaldehyde and more particularly to corrugated boards with soy based adhesive systems.

BACKGROUND OF THE INVENTION

Urea-Formaldehyde (UF) resins are widely used as a binder for use in oriented strand board and particle board. These formaldehyde-based resins are inexpensive, colorless, and are able to cure fast to form a rigid polymer. Despite the effectiveness of the UF resins, particle board and oriented strand board often has a reputation for being of poor quality. Included in the quality is concern about the rate that these composites degrade when exposed to water or heat and humidity.

Another serious disadvantage of UF resin-bonded wood products is that they slowly emit formaldehyde into the surrounding environment. Formaldehyde is a know carcinogen and is part of a class of compounds that are commonly known as Volatile Organic Compounds (VOCs). Due to environmental, health, and regulatory issues related to formaldehyde emissions from wood products, there is a continuing need for alternative formaldehyde-free binders. Recent legislation has prohibited or severely restricted the use of formaldehyde in furniture and building materials in one or more states.

A number of formaldehyde-free compositions have been developed for use as a binder for making wood products. U.S. Pat. No. 4,395,504 discloses the use of formaldehyde-free adhesive system prepared by a reaction of a cyclic urea with glyoxal, for the manufacture of particleboard. Such a system, however, showed a rather slow cure and required acidic conditions (low pH) for the cure.

U.S. Pat. No. 5,059,488 shows an advantage of glutaraldehyde over glyoxal, when used in a reaction with cyclic urea. The patent discloses the use of glutaraldehyde-ethylene urea resins for wood panel manufacture. It was shown that this resin cured faster than glyoxal-ethylene urea resin, and the cure can be performed at a relatively high pH. However, the glutaraldehyde-based resins are not economically feasible.

U.S. Pat. No. 4,692,478 describes a formaldehyde-free binder for particleboard and plywood prepared of carbohydrate raw material such as whey, whey permeate, starch and sugars. The process comprises hydrolysis of the carbohydrate by a mineral acid, and then neutralizing the resin by ammonia. Although the raw materials are cheap and renewable, the reaction has to be performed at about 0.5. The pH makes handling difficult, dangerous, and costly.

U.S. Pat. No. 6,822,042 also discloses the use of a carbohydrate material (corn syrup) for preparing a non-expensive wood adhesive. Advantages of this binder include strong bonding, low cost, and renewable raw material. However, this adhesive requires the use of isocyanate as a cross-linker for this composition. Isocyanates are toxic making the use as a substitute for formaldehyde undesirable.

U.S. Pat. No. 6,599,455 describes a formaldehyde-free binder for producing particleboard containing curable thermoplastic co-polymers and cross-linkers selected from epoxy, isocyanate, N-methylol and ethylene carbonate compounds. Such compositions provide good strength and water resistance when cured. The epoxys are economically unfeasible do to the high material cost.

U.S. Pat. No. 6,348,530 describes a formaldehyde-free binder for producing shaped wood articles comprising a mixture of hydroxyalkylated polyamines and polycarboxylic acids. The binder preparation requires difficult steps to product and as a result is not economically viable.

One product that has emerged as a substitute for formaldehyde products is Purebond® proprietary manufacturing system for hardwood, plywoods and particle board. However, it is believed that Purebond® may include other toxic chemicals such as epichlorohydrin. While Purebond® is an improvement over the state of the art, it ultimately does not eliminate all dangerous or potentially dangerous compounds from its formulation. See http://www.columbiaforestproducts.com/products/prodpb.aspx.

See also U.S. Pat. No. 7,252,735. U.S. Pat. No. 7,345,136 (Heartland Resources Technologies) is believed to relate to H2H proprietary product, Soyad®. Soyad® is believed to include soy protein in a resin form, but does not eliminate the use of carcinogenic binders in combination with the soy protein.

Thus, after considerable attempts to solve the problem of urea formaldehyde adhesives, there exists a need to create a truly non-toxic high strength resin or composite system that does not contain any formaldehyde compositions or other carcinogenic compounds, is earth friendly and remarkably strong.

The state of the art is to find a resin that would be an effective replacement of formaldehyde resins. However, it would be desirable to provide a board that exceeds the current state of the art of particle board in strength. It would be further advantageous if this material was biodegradable, substantially, if not entirely from renewable sources, was environmentally friendly, and is stronger than state of the art particle board. It would be advantageous if the furniture boards had a thick, robust profile, but is surprisingly light weight. It is desirable that such curable compositions contain relatively high amount of non-volatiles, and at the same time are stable, fast-curing and do not emit any toxic fumes during the cure and afterwards. It would be desirable for the product to be not harmful to the environment when placed in a landfill. The present invention addresses one or more these and other needs.

SUMMARY OF THE INVENTION

The present invention includes a high-strength, light-weight corrugated board. The board comprises a first pressed sheet made of a soy protein based resin and one or more sheets of plant-based fibers. The first pressed sheet is connected to a corrugated member. In one embodiment the plant-based fibers include one or more of flax, hemp, ramie, sisal, jute, kapok, banana, pineapple and kenaf. In another embodiment, the present invention includes a second sheet. Optionally, the second sheet is made of a soy protein based resin and one or more sheets of plant-based fibers. The first sheet is substantially planar to the second sheet. Both sheets are connected to a corrugated member.

In one embodiment, the high-strength, corrugated board comprises a first sheet made of a soy protein based resin and one or more sheets of plant-based fibers. The corrugated member connected to the first sheet, wherein the first sheet has a maximum thickness of about 7 millimeter and the corrugated board has a minimum thickness of 1.8 mm, the board has a density of less than 300 kg/m$^3$ and a strength on the ASTM D790 three point bend test of ASTM D790 of greater than 600 KPa.

The term "corrugated" refers to any relatively light weight material that is designed and configured to be affixed to one layer or sandwiched between two layers to space the layers apart and increase the strength of the corrugated board relative to the strength of the individual layers while decreasing substantially the density of the corrugated board relative to the density of the individual sheets. A corrugated member include in one embodiment a fluted member. It may include in another embodiment, a plurality of strips that are adhered to one another periodically and pulled apart in an accordion like fashion forming a pattern such as a honeycomb pattern. The corrugated member also includes lightweight fillers and foams that can be bound to one layer or sandwiched between two layers.

In one embodiment, the corrugated board has enhanced strength properties relative to the individual boards that form the corrugated board. Typically, the boards will have a strength on the ASTM D790 three point bend test of ASTM D790 of greater than about 600 KPa, about 700 KPa, about 800 KPa, about 900 KPa or about 1 MPa.

The corrugated board has lightweight properties relative to solid boards of the same thickness. In the present invention, the density of the board is less than about 3 kg/m$^3$, about 2.8 kg/m$^3$ or about 2.7 kg/m$^3$.

In another embodiment, the corrugation comprises a plurality of periodically and or systematically spaced apart dowel pins or spacers.

Preferably, the corrugated member is biodegradable, non-toxic, earth friendly, and from a renewable source. In one embodiment, the corrugated member is made of expanded fillers made from puffed grains such as wheat, rice and corn. In another embodiment, the corrugated members are paper products that are formed to fluted members.

In one aspect of the present invention, there is a method of manufacturing a high-strength, corrugated board. The method comprises providing a first plurality of sheets of plant based fibers. In one embodiment, the plant-based fibers include one or more of flax, hemp, sorghum, ramie, sisal, jute, kapok, banana, pineapple and kenaf. The method further includes impregnating a soy-based resin into the first plurality of sheets. Then, the first plurality of sheets is individually dried. The step of drying prevents folding or kinking of the sheets. The first plurality of sheets then is separately stacked. The stacked sheets are pressed at a temperature that is a minimum of 80° C., a pressure that is a minimum of 3 MPa, and for a time that is a minimum of 10 minutes to form a first pressed sheet. The first pressed sheet is affixed to a corrugated member. Alternatively, the process includes preparation of a second pressed sheet. The second pressed sheet is made by following the steps of making the first pressed sheets in an embodiment. The second pressed sheet is oriented coplanar to the first pressed sheet and is affixed to the corrugated member.

According to one embodiment, the first and second sheets are a maximum thickness of about one centimeter, about 9 mm, about 8 mm, about 7 mm, about 6 mm or about 5 mm and a minimum thickness of about 1 mm, about 2 mm, about 3 mm, about 4 mm, about 5 mm.

In another embodiment, the resin further comprises a carboxy-containing polysaccharide. Typically, the polysaccharide is selected from a group consisting of agar, gellan and mixtures thereof.

In an embodiment, the resin is substantially free of starch. In another embodiment, the resin is substantially free of formaldehyde resins. Furthermore, it is advantageous if the resin is substantially free of cross-linking agents. In another embodiment, the resin contains no formaldehyde resin. "No formaldehyde resin," means that an analysis of the materials would not find detectable amounts of formaldehyde resin.

In yet another embodiment, the article of furniture is made from the corrugated board above. The article has at least one load bearing horizontal member that has a minimum length of eighteen inches, the article of manufacture being selected from the group consisting of chairs, shelves, desks, tables, cabinets, doors, panels or office cubicle walls.

In an embodiment, the board was compressed from two or more sheets of uniform thickness that are individually impregnated with uniform amount of resin, wherein the amount of resin as a percentage of the total dry weight of the composition is a minimum of about 30 wt. %, about 35 wt. %, about 40 wt. %, about 45 wt. %, about 50 wt % and a maximum of about 75 wt. %, about 70 wt %, about 65 wt. % or about 60 wt. %.

In another embodiment, the corrugated member is biodegradable. Preferably, the corrugated member is made of soy protein resin according to one embodiment.

In another embodiment, the step of drying occurs at a pressure that is a maximum of 0.9 atm.

DETAILED DESCRIPTION OF THE INVENTION

Definitions

The term "biodegradable" is used herein to mean degradable over time by water, microbes and/or enzymes found in nature (e.g. compost), without harming the environment. To be considered strictly biodegradable a material is required to degrade a minimum of 60% within 180 days under compostable conditions that are defined by ASTM D790.

The term "stress at maximum load" means the stress at load just prior to fracture, as determined by the stress-strain curve in a tensile test.

The term "fracture stress" means the stress at fracture as determined by the stress-strain curve in a tensile test.

The term "fracture strain" means the strain (displacement) at fracture, as determined by the stress-strain curve in a tensile test.

The term "modulus" means stiffness, as determined by the initial slope of the stress-strain curve in a tensile test.

The term "toughness" means the amount of energy used in fracturing the material, as determined by the area under the stress-strain curve.

The "tensile test" referred to is carried out using Instron or similar testing device according to the procedure of ASTM Test No. D882 for resin sheets and D3039 for composites. Testing is carried out after 3 days conditioning at 21° C. and 65% relative humidity.

The term "strengthening agent" is used herein to describe a material whose inclusion in the biodegradable polymeric composition of the present invention results in an improvement in any of the characteristics "stress at maximum load", "fracture stress", "fracture strain", "modulus", and "toughness" measured for a solid article formed by curing of the composition, compared with the corresponding characteristic measured for a cured solid article obtained from a similar composition lacking the strengthening agent.

The term "curing" is used herein to describe subjecting the composition of the present invention to conditions of temperature and effective to form a solid article having a moisture content of preferably less than about 0.5 wt. %.

The phrase "free of formaldehyde" or "formaldehyde free" means the materials used do not contain formaldehyde or a compound that will release formaldehyde in the manufacturing process or during the effective life of the product.

The Fiber Mats or Sheets

In accordance with the present invention, the soy impregnated fiber mat plies are made of biodegradable fiber mats or sheets and biodegradable polymeric resin that comprises soy protein. Preferably the mats and sheets are biodegradable and from a renewable natural resource.

In one embodiment, the mats or sheets are woven or non-woven fabrics made of any biodegradable material that has fibers useful in making fabric, cords or string. In one embodiment, the biodegradable fibers are made of cotton, silk, spider silk, hemp, ramie, kenaf, sorghum, burlap, flax, sisal, kapok, banana, pineapple wool, hair or fur, jute, polylactic acid (PLA), viscose rayon, lyocell, or combinations thereof.

In one embodiment, the fabrics are preferably made of hemp, sorghum, ramie, kenaf, burlap, jute, flax, sisal, kapok, banana or pineapple fibers.

In an embodiment, the fibers are yarn, woven, nonwoven, knitted or braided. The mats are preferably of uniform thickness and water absorbent to facilitate easy impregnation of the mats by soy based resin. In one embodiment the mats are nonwoven and have a mass per area that is a minimum of about 100 g/m$^2$, about 200 g/m$^2$ or about 300 g/m$^2$ and/or a maximum of about 500 g/m$^2$, about 600 g/m$^2$ or about 800 g/m$^2$.

In one preferred embodiment, the mats are nonwoven and are made of natural fibers (e.g. kenaf fibers) that are blended with a binding fiber that will bind to the natural fibers under conditions of heat and pressure. One example of a binding fiber is poly(lactic acid). Poly(lactic acid) fibers are blended with the natural fibers. The blended fibers are heat pressed. The poly(lactic acid) readily melts during the heat press stage and binds the kenaf fibers together. Degradable fibers that are capable of binding to natural fibers to form a workable mat include wool, viscose rayon, lyocell, and poly(lactic acid) and combinations thereof.

In one embodiment, the non-woven mats comprise, prior to impregnation, a binding fiber in an amount that is a minimum of about 1 wt. %, about 2 wt. %, about 5 wt. %, about 7 wt. % and/or a maximum of about 20 wt. %, about 17 wt. %, about 15 wt. %, about 12 wt. % or about 10 wt. %. Optionally, the non-woven mats comprise, prior to impregnation, natural fiber that is a minimum of about 80 wt. %, about 82 wt. %, about 85 wt. %, about 87 wt. % or about 90 wt. %.

Resin

In one embodiment, the resin includes soy protein and a soluble strengthening agent (i.e., substantially soluble in water at a pH of about 7.0 or higher. In one embodiment, the soluble strengthening agent is a polysaccharide. Preferably, the polysaccharide is a carboxy-containing polysaccharide. In one preferred embodiment, the soluble strengthening agent is selected from the group consisting of agar agar, agar, gellan, and mixtures thereof.

Soy protein is the basis for the resin of the present invention. Soy protein can be obtained in soy flour, soy protein concentrate and soy protein isolate. Each of these sources has increasing concentrations of soy protein. Preferably, soy protein concentrate is used because of it has an excellent tradeoff between cost and concentration of soy protein.

The amount of soy protein added to the fiber mats, fabrics, or yarns, results in composite panels that have a minimum of about 30 wt % soy protein, about 35 wt. % soy protein, about 40 wt. % soy protein, about 50 wt. % soy protein and/or a maximum of about 70 wt. % soy protein, about 65 wt. % soy protein, about 60 wt. % soy protein, about 55 wt. % soy protein or about 50 wt. % soy protein based upon the final weight of the finished panel.

Soy protein has been modified in various ways and used as resin in the past, as described in, for example, Netravali, A. N. and Chabba, S., *Materials Today*, pp. 22-29, April 2003; Lodha, P. and Netravali, A. N., *Indus. Crops and Prod.* 2005, 21, 49; Chabba, S. and Netravali, A. N., *J. Mater. Sci.* 2005, 40, 6263; Chabba, S. and Netravali, A. N.,
*J. Mater. Sci.* 2005, 40, 6275; and Huang, X. and Netravali, A. N., *Biomacromolecules,* 2006, 7, 2783.

Soy protein contains about 20 different amino acids, including those that contain reactive groups such as —COOH, —NH$_2$ and —OH groups. Once processed, soy protein itself can form crosslinks through the —SH groups present in the cysteine amino acid as well as through the dehydroalanine (DHA) residues formed from alanine by the loss of side chain beyond the β-carbon atom. DHA is capable of reacting with lysine and cysteine by forming lysinoalanine and lanthionine crosslinks, respectively. Asparagines and lysine can also react together to form amide type linkages. All these reactions can occur at higher temperatures and under pressure that is employed during curing of the soy protein.

In addition to the self-crosslinking in soy protein, the reactive groups can be utilized to modify soy proteins further to obtain desired mechanical and physical properties. The most common soy protein modifications include: addition of crosslinking agents and internal plasticizers, blending with other resins, and forming interpenetrating networks (IPN) with other crosslinked systems. Without being limited to a particular mechanism of action, these modifications are believed to improve the mechanical and physical properties of the soy resin.

The properties (mechanical and thermal) of the soy resins can be further improved by adding nanoclay particles and micro- and nano-fibrillar cellulose (MFC, NFC), as described in, for example, Huang, X. and Netravali, A. N., "Characterization of flax yarn and flax fabric reinforced nana-clay modified soy protein resin composites," *Compos. Sci. and Technol.*, in press, 2007; and Netravali, A. N.; Huang, X.; and Mizuta, K., "Advanced green Composites," *Advanced Composite Materials*, submitted, 2007.

The resin can include additional non-soluble strengthening agents of natural origin that can be a particulate material, a fiber, or combinations thereof. The non-soluble strengthening agent may be, for example, a liquid crystalline (LC) cellulose nanoclay, microfibrillated cellulose, nanofibrillated cellulose.

Further in accordance with the present invention, a composition containing agar, agar agar or gellan and soy protein can be optionally employed together with natural and high strength liquid crystalline (LC) cellulosic fibers to form biodegradable composites. The LC cellulose fibers can be produced by dissolving cellulose in highly concentrated phosphoric acid to form a LC solution of cellulose, as described in Borstoel, H., "Liquid crystalline solutions of cellulose in phosphoric acid," Ph. D. Thesis, Rijksuniversiteit, Groningen, Netherlands, (1998). The resulting LC solution was spun using an air gap-wet spinning technique to obtain highly oriented and crystalline cellulose fibers that had strengths in the range of 1700 MPa.

The resin can include additional non-soluble strengthening agents of natural origin that can be a particulate material, a fiber, or combinations thereof. The non-soluble strengthening agent may be, for example, a liquid crystalline (LC) cellulose nanoclay, microfibrillated cellulose, nanofibrillated cellulose.

Gellan, a linear tetrasaccharide that contains glucuronic acid, glucose and rhamnose units, is known to form gels through ionic crosslinks at its glucuronic acid sites, using divalent cations naturally present in most plant tissue and culture media. In the absence of divalent cations, higher concentration of gellan is also known to form strong gels via hydrogen bonding. The mixing of gellan with soy protein isolate has been shown to result in improved mechanical properties. See, for example, Huang, X. and Netravali, A. N., *Biomacromolecules*, 2006, 7, 2783 and Lodha, P. and Netravali, A. N., *Polymer Composites*, 2005, 26, 647.

Gellan gum is commercially available as Phytagel™ from Sigma-Aldrich Biotechnology. It is produced by bacterial fermentation and is composed of glucuronic acid, rhanmose and glucose, and is commonly used as a gelling agent for electrophoresis. Based on its chemistry, cured Phytagel™ is fully degradable. In preparing a composition of the present invention wherein cured gellan gum is the sole strengthening agent, Phytagel™ is dissolved in water to form a solution or weak gel, depending on the concentration. The resulting solution or gel is added to the initial soy protein powder suspension, with or without a plasticizer such as glycerol, under conditions effective to cause dissolution of all ingredients and produce a homogeneous composition.

Preferably, the weight ratio of soy protein:strengthening agent in the resin of the present invention is a minimum of about 20:1, about 15:1, about 10:1, about 8:1, about 4:1, about 3:1 and/or a maximum of about 1:1, about 2:1, about 2.5:1, about 3:1 and about 4:1.

The composition may also include a plasticizer. Plasticizers according to the present invention include glycerol, sorbitol, xylitol, manitol, propylene glycol, as well as any oils or fatty acids. Plasticizers are known in the art. Preferably, plasticizers are biodegradable, from a renewable source and are non-toxic. The weight percentage of plasticizer in the resin (excluding water) is a minimum of about 5 wt. %, about 8 wt. %, about 10 wt. %, about 12 wt. % or about 15 wt. % and/or a maximum of about 20 wt. %, about 18 wt. %, about 15 wt. %, about 12 wt. % or about 10 wt. %.

The biodegradable polymeric composition of the present invention preferably is substantially free of a starch additive. The biodegradable polymeric composition is substantially free of supplementary crosslinking agents such as, for example, acid anhydrides, isocyanides and epoxy compounds.

Method of Making Resin

A biodegradable resin in accordance with the present invention may be prepared by the following illustrative procedure:

Into a mixing vessel at a temperature of about 70-85° C. is added 50-150 parts water, 1-5 parts glycerol, 10 parts soy protein concentrate or isolate, and 1-3 parts gellan, agar agar, agar or mixtures thereof. To the mixture is added, with vigorous stirring, a sufficient amount of aqueous sodium hydroxide to bring the pH of the mixture to about 11. The resulting mixture is stirred for 10-30 minutes, and then is filtered to remove any residual particles. Optionally, clay nanoparticles and/or cellulose nanofibers, nanofibrils (NFC) or micro fibrils (MFC) may be added to the resin solution as additional strengthening agents.

Method of Making Composite Boards

The resin solution so produced is used to impregnate and coat one or more fiber mats or fabric sheets. The mats may comprise, for example, jute, kenaf, burlap, flax, ramie, sisal, kapok, banana, sorghum, pineapple, hemp fiber or combinations thereof. In one embodiment, the fabric sheet is preferably flax. The mat is preferably jute or kenaf.

Resin solution is applied to a fiber mat or sheet in an amount of about 50-100 ml of resin solution per 15 grams of fiber so as to thoroughly impregnate the mat or sheet and coat its surfaces. The mat or sheet so treated is pre-cured by drying in an oven at a temperature of about 35-70° C. to form what is referred to as a prepreg. In one embodiment, the prepreg is dried at a pressure that is a maximum of 0.9 atm. The low pressure aids in removing water faster from the impregnated sheets. As needed, the prepreg sheets are potentially impregnated a second time and dried according to one or more conditions described above.

The prepreg mats are arranged into sheets of sufficient size (thickness) and are layered on top of one another. In one embodiment, the first plurality of prepreg mats and the second plurality of prepreg mats require a minimum of about 2 prepreg sheets, about 3 prepreg sheets, about 4 prepreg sheets, about 5 prepreg sheets and/or a maximum of about 10 prepreg sheets, about 8 prepreg sheets, about 7 prepreg sheets, about six prepreg sheets. When stacking the plurality of prepreg sheets care should be taken to prevent any folding of the sheets.

The prepreg sheets are sized to exceed recommended dimension by a minimum of 1 cm in length and width of the desired. Through experience it has been found that manufacture of a composite board of uniform thickness of a size greater than about 4 feet in length and two feet in width requires assembling pieces that are slightly oversized. Otherwise, the edges of the board may not be made with uniform thickness desirable in a building product.

In one embodiment, five sheets are stacked as described above and are subject to high pressure and temperature to cure. By way of example, the stack is hot pressed for 2-10 minutes at about 80° C. and a pressure of 0.5-1 MPa. Following a rest period of about 5 minutes, the stack is hot pressed for 5-15 minutes at 120-130° C. and a load of 2-10 MPa, followed by removal from the press. The resulting first and second sheets have the appearance of a solid piece of material and a thickness of about 5 mm.

Then, the outer perimeter is cut to the desired size. The first and second sheets are connected via a corrugated member.

A corrugated member includes in one embodiment a fluted member. It may include in another embodiment, a plurality of strips that are adhered to one another periodically and pulled apart in an accordion like fashion forming a pattern such as a honeycomb pattern. The corrugated member also includes lightweight fillers and foams that can be bound to one layer or sandwiched between two layers. In another embodiment, the corrugation comprises a plurality of periodically and or systematically spaced apart dowel pins or spacers.

Preferably, the corrugated member is biodegradable, nontoxic, earth friendly and from a renewable source. In one embodiment, the corrugated member is made of expanded fillers made from puffed grains such as wheat, rice and corn. In another embodiment, the corrugated members are paper products that are formed of fluted members.

In one embodiment, the corrugated member is a soy protein composite that is pressed into a corrugated member. In another embodiment, the corrugated member is biodegradable composite, paper, cardboard, with sheet thickness that is a minimum of about 0.5 mm, about 0.7 mm, about 1 mm, about 2 mm and a maximum of about 5 mm, about 3 mm, about 2 mm or about 1 mm. The flute width of one embodiment is a minimum of about 2 mm, about 5 mm, or about 10 mm and/or a maximum of about 40 mm, about 30 mm, about 20 mm, about 17 mm, about 15 mm, about 12 mm, about 10 mm. The shapes of the flute can be varied. In one embodiment, the corrugated member has flutes that are angular, square, sinusoidal or variations on these shapes. In another embodiment, the heights can also be varied as desired. In addition the shape of the flutes can be three-dimensional, e.g. the shape can be waffle-like.

The corrugated members may be formed using a conventional thermoforming molding process, using apparatus described in U.S. patents classified in class 425, subclasses 369 (apparatus wherein reshaping means creates accordion-like pleats or wrinkles or the like in a preform by distorting a section thereof transverse to its axis into a plurality of reversing curves) and 336 (apparatus comprising means for shaping an advancing length of work into ridges and grooves).

In one embodiment of the present invention, one or two surfaces of the corrugated board is laminated with a veneer. The veneer can improve appearance as well as water resistant properties of the corrugated board. The veneer of one embodiment is a wood veneer, or printed paper veneer. The veneer may be laminated or coated to produce a waterproof finish. The coating of one preferred embodiment incorporates a natural whey ingredient to improve its earth friendly properties according to formulas known in the art. In another embodiment, the coating is not a biodegradable coating. For example polyurethane or epoxide coatings are used to cover the surface of the corrugated board. In another embodiment, formica is the laminated outer layer. While it is understood that non-biodegradable materials are less desirable from a ecological standpoint, the use of petroleum products on the outer layers is often worthwhile for furniture or other objects to produce a long-lasting durable product where the bulk of that product is made from renewable and biodegradable materials.

Also in accordance with the present invention, a biodegradable molded thermoset polymeric article is obtained by subjecting the biodegradable polymeric composition described above to conditions of temperature and pressure effective to form the thermoset polymeric article. Effective temperature and pressure conditions preferably comprise a temperature that is a minimum of about 35° C. and a maximum of about 130° C. and a pressure that is a minimum of about 0.1 MPa and a maximum of about 20 MPa, more preferably, a temperature that is a minimum of about 80° C. and a maximum of about 120° C. and a pressure that is a minimum of about 2 MPa and a maximum of about 20 MPa.

In one preferred embodiment, the molded thermoset polymeric article comprises a thermoset sheet, which may be included in a stacked array of thermoset sheets.

Alternatively, the biodegradable press-shaped thermoset polymeric article may be shaped by a mold.

Preferably, the biodegradable press-shaped thermoset polymeric article is characterized by stress at maximum load of at least about 20 MPa and/or a modulus of at least about 300 MPa.

In one embodiment, the corrugated boards are of a size that is about 8 feet by four feet, four feet by two feet, and twelve feet by four feet. These panels have excellent nail and screw retention properties, can be painted effectively and are strong. They can be cut or drilled without frayed edges and are consistent in width throughout the surface area. In another embodiment, the panels are effective in making office cubicles and partitions. In another embodiment, they are used for making cabinetry. In another embodiment, the panels are excellent for use in manufacturing furniture, particularly low profile furniture. Other applications include chairs, shelves, desks, tables and doors.

The corrugated members have improved strength properties relative to the individual sheets that form the corrugated members. They are considerably lighter than a solid board of the same thickness of the corrugated board. In one embodiment, a corrugated member connected to the first sheet. The first sheet has a maximum thickness of about 7 millimeters, about 6 millimeters or about 5 millimeters. Likewise, the minimum thickness of the corrugated board is 1.8 mm, 2.0 mm, 2.2 mm or 2.4 mm. The board should have a density calculated by the weight of a one square decimeter of the board divided by its length times widths times the thickness of the board.

The strength of the board is tested according to ASTM D790 three point bend test. The board has a strength greater than 600 KPa, 700 KPa, 800 KPa, 900 KPa, and 1 MPa.

Figure 1:
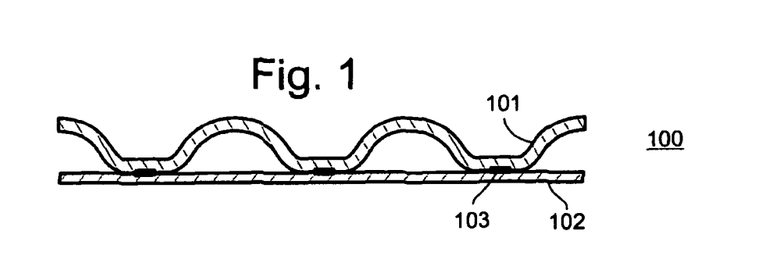
FIG. 1 is a side view of a corrugated board according to one embodiment of the invention.

FIG. 1 depicts a biodegradable corrugated board 100 of the present invention that includes a corrugated member 101 that is coextensive with a first heat-pressed sheet 102 that is made according to one or more embodiments of the present invention. The corrugated member 101 is affixed to the first sheet 102 by an adhesive 103 that preferably is biodegradable. Suitable adhesives include starch based adhesives such as commonly used in the manufacture of corrugated fiberboard or the soy based resin according to one or more embodiments of the present invention. When the soy-based adhesive is used as an adhesive, it is advisable to apply pressure and heat to thermoset the soy based resin. In another embodiment, poly (vinyl alcohol) or poly(vinyl acetate) adhesives are used such as wood glue. In one embodiment, wood glues are available from, for example, Franklin Adhesive under the trade name Titebond®.

Figure 2:
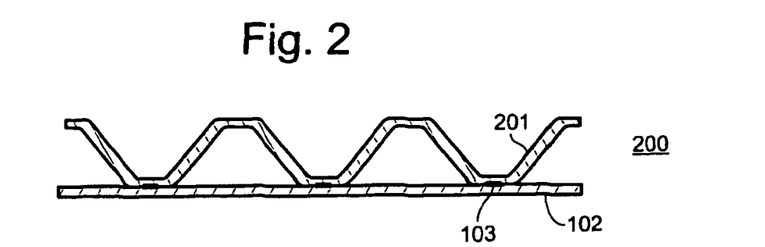
FIG. 2 is a side view of a corrugated board according to another embodiment of the invention.

FIG. 2 depicts a biodegradable corrugated board 200 of the present invention that includes a corrugated member 201 that is coextensive with a first heat pressed sheet 102. The corrugated member 201 is affixed to the first sheet 102 by an adhesive 103 that preferably is biodegradable. Board 200 differs from the board 100 depicted in FIG. 1 in that corrugated 201 has ridges and valleys that are approximately V-shaped rather, in contrast to the approximately U-shaped ridges and valleys of corrugated sheet 101.

Figure 3:
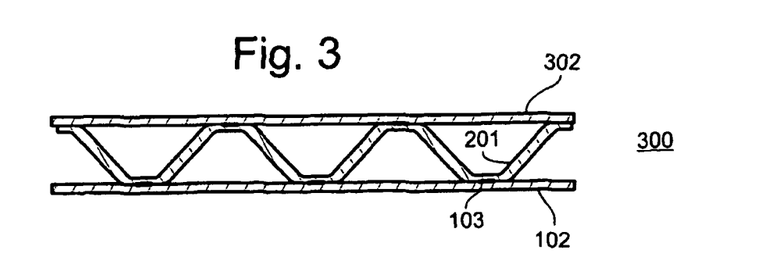
FIG. 3 is a side view of a corrugated board according to yet another embodiment of the invention.

FIG. 3 depicts a biodegradable corrugated board 300 of the present invention that includes a corrugated member 201 that is coextensive with a first pressed sheet 102 that is prepared according to one or more embodiments of the present invention. The corrugated member 201 is affixed to the first sheet 102 by an adhesive 103 that preferably is biodegradable.

Board 300 differs from the board 200 depicted in FIG. 2 by the addition of a second sheet 302 that is optionally prepared according to one or more embodiments of the present invention. An adhesive 103 is used to affix the second sheet 302 to the corrugated member 201. First and second sheets 102 and 302 thus comprise a sheath for corrugated member 201, which provides enhanced bending stiffness, particularly in the direction of the corrugations to board 300.

Figure 4:
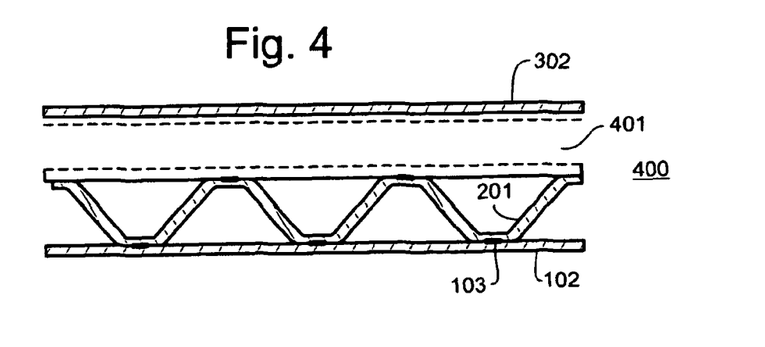
FIG. 4 is a side view of a corrugated board according to one embodiment of the invention.

FIG. 4 depicts a biodegradable corrugated board 400 of the present invention that includes a corrugated member 201 that is coextensive with a first, heat-pressed sheet 102 that is made according to one or more embodiments of the present invention. The corrugated member 201 is affixed to the first sheet 102 by an adhesive 103 that is, preferably, biodegradable. Board 400 differs from the board 300 depicted in FIG. 3 by the inclusion of a second corrugated member 401 that is orthogonally disposed relative to first corrugated sheet 201 and is affixed to the second sheet 302 and first corrugated member 201 by an adhesive 103 that is preferably biodegradable.

The two superimposed corrugated members 201 and 401 whose corrugations are orthogonal to one another and are secured by an adhesive 103 to the flat outer sheets 102 and 302, respectively, provide board 400 with enhanced stiffness in both directions.

Although the corrugated members 101, 201, and 401 depicted in FIGS. 1-4 are preferably formed from the thermoset soy protein composition of the present invention, they may, for certain applications, be formed from other materials such as, for example, paper.

Figure 5:
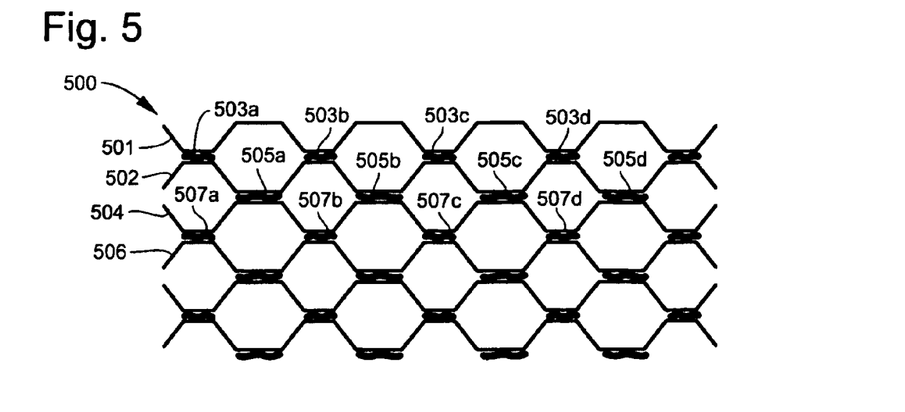
FIG. 5 is an elevated side view of a honeycomb corrugation of one embodiment of the present invention.

FIG. 5 is an elevated side view of a honeycomb corrugated members 500. The corrugated member is formed by adhering a first strip of paper 501 to a second strip of paper 502 at equally spaced apart intervals (503a, 503b, 503c, 503d, etc). These intervals define a first interval pattern. The second strip of paper 502 is adhered to a third strip of paper 504 at equally spaced apart intervals (505a, 505b, 505c, 505d, etc) offset from the first interval pattern. A fourth strip of paper 506 is adhered to the third strip of paper 504 at equally spaced apart intervals (507a, 507b, 507c, 507d, etc) that are aligned with the first interval pattern. A fifth strip of paper 508 is adhered to the fourth strip of paper 506 at intervals (509a, 509b, 509c, 509d, etc) aligned with the second interval pattern. Subsequent layers are added and adhered to the previous layer at alternating first interval patterns and second interval patterns. The corrugated member is formed then by separating the layers. forming an accordion like generally hexagonal pattern or honeycomb pattern.

In a manufacturing process, large sheets of paper are adhered to one another along lines of adhesive at the interval locations defined according to the pattern disclosed above. The sheets then can be cut at a predefined thickness and can be stretched into a honey comb pattern.

Figure 6:
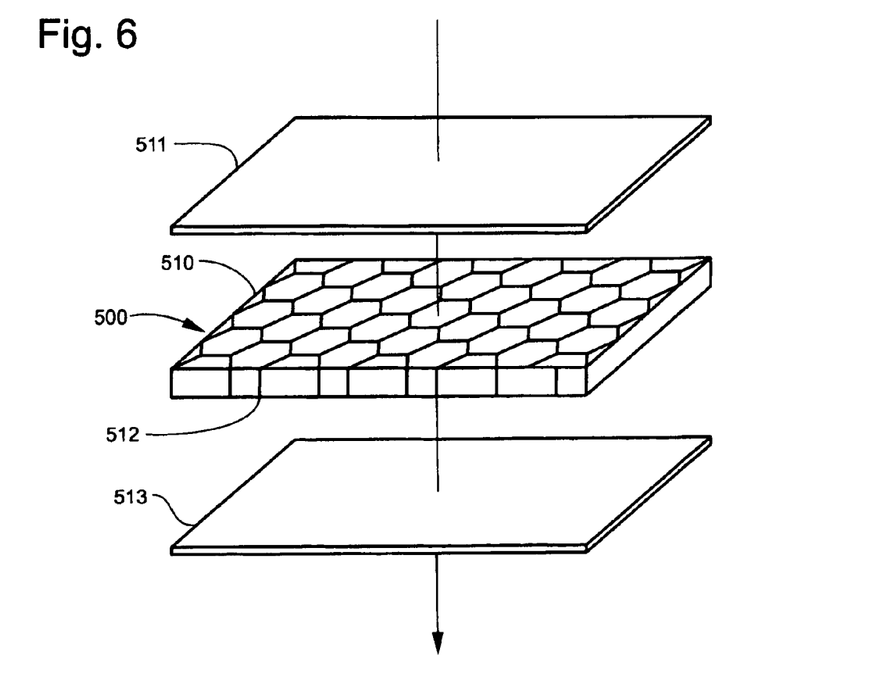
FIG. 6 is an exploded view of the honey comb corrugation of one embodiment of the present invention.

FIG. 6 is an exploded view of the honey comb corrugation of FIG. 5 in a corrugated board. The honeycomb corrugated member 500 is opened in an accordion fashion to form the corrugation pattern. The first side 510 of the corrugated member 500 is adhered to the first composite layer 511. The second side 512 of the corrugated member 500 is adhered to the second composite layer 513. The corrugated member 500 supports the two composite layers and space them apart by a distance of the width of the corrugated member.

Figure 7:
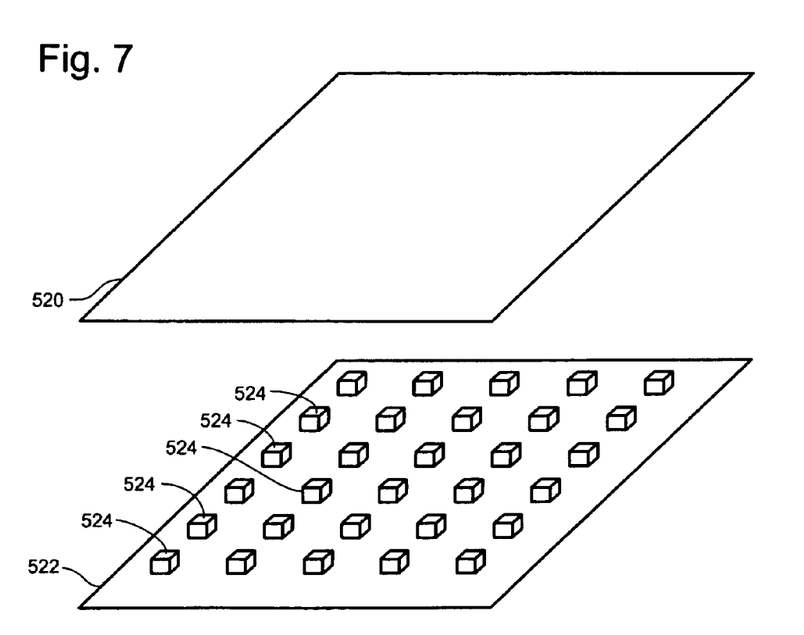
FIG. 7 is an illustration of a view of a corrugation system comprising a plurality of spacers.

FIG. 7 illustrates corrugation system comprising a plurality of spacers. The strength of the first and second layers of soy protein composite manufactured according to the present invention allow greater latitude in adopting various corrugation systems. In one embodiment the corrugation system is defined by individually spaced apart spacers or dowel pins. The spacers are spaced apart from one another a distance that is a minimum of 3 cm, 4 cm, 5 cm and at a maximum distance of 15 cm, 12 cm, 10 cm, 8 cm or 6 cm. according to one or more alternative embodiments. The spacers of one embodiment may be wooden blocks, paper squares, dowel pins.

Figure 8A:
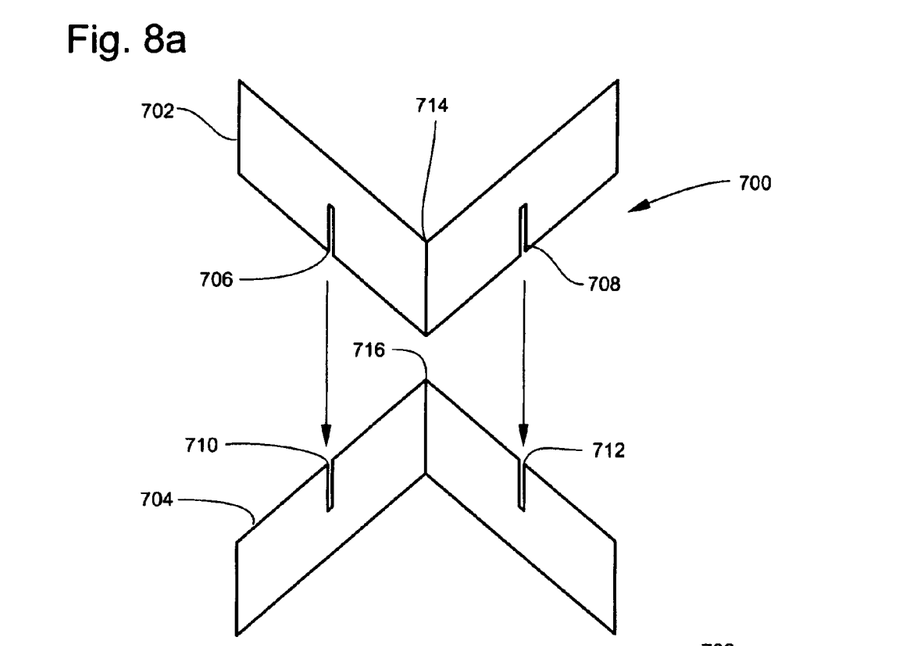
FIG. 8 is an illustration of one spacer according to one embodiment.
Figure 8B:
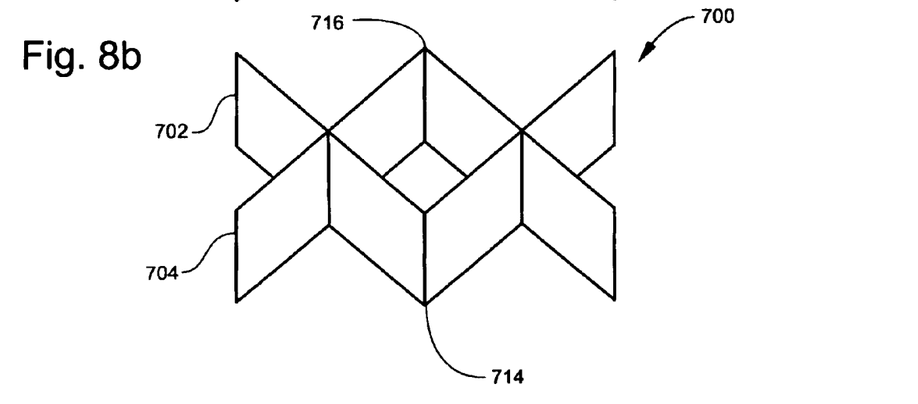

FIG. 8 illustrated a paper square 700 manufactured according to one embodiment of the present invention. The square 700 has a first paper member 702 and a second paper member 704. The first paper member has a first slot 706 and a second slot 708.

The slots have a width equal to the thickness of the paper and preferably have depth that is a minimum of ½ of the width of the paper. The second paper member 704 has corresponding slots 710 and 712 that are likewise sized and shaped as the slots 706 and slot 708 but are formed in opposite directions thereto. A fold (714 and 716) in each of the first paper member 702 and the second paper member 703 equidistance between the two slots in each paper. The slots 706 and 708 in the first paper are receive into the slots 710 and 712 of the second paper forming a three dimensional spacer that can be placed between the first sheet and the second sheet to form a corrugated member.

While the invention has been described by reference to various specific embodiments, it should be understood that numerous changes may be made within the spirit and scope of the inventive concepts described. Accordingly, it should be recognized that the invention is not limited to the described embodiments.

What is claimed is:

1. A high-strength, corrugated board comprising:
    a first sheet made of a soy protein based resin and one or more sheets of plant-based fibers;
    a corrugated member connected to the first sheet, wherein the first sheet has a maximum thickness of about 7 millimeter and the corrugated board has a minimum thickness of 1.8 mm, the board has a density of less than 300 kg/m$^3$ and a strength on the ASTM D790 three point bend test of ASTM D790 of greater than 600 KPa.

2. The corrugated board of claim 1, wherein the plant-based fibers include but are not limited to one or more of sorghum, flax, hemp, ramie, sisal, jute, kapok, banana, pineapple and kenaf.

3. The board of claim 1, wherein the board further comprises a second sheet made of a soy protein based resin and one or more sheets of plant-based fibers.

4. The board of claim 3, wherein the second sheet is coplanar to the first sheet and being connected to the corrugated member.

5. The board of claim 3, wherein the first and second sheets are formed by compression at a temperature that is a minimum of 80 C, a pressure that is a minimum of 3 MPa, and for a time that is a minimum of 10 minutes.

6. The board of claim 3, wherein the resin further comprises a carboxy-containing polysaccharide is selected from a group consisting of agar agar, agar, gellan and mixtures thereof.

7. The board of claim 2, wherein the resin is substantially free of starch.

8. An article of furniture made from the board of claim 3, wherein the article has at least one load bearing horizontal member that has a minimum length of eighteen inches, the article of manufacture being selected from the group consisting of chairs, shelves, desks, tables, kitchen and other cabinets, doors, panels or office cubicle walls.

9. The board of claim 3, wherein the board was compressed from two or more sheets of uniform thickness that are individually impregnated with uniform amount of resin, wherein the amount of resin as a percentage of the total dry weight of the composition is a minimum of 30 wt. % and a maximum of 75 wt. %.

10. The board of claim 3, wherein the corrugated member is biodegradable.

11. The board of claim 1, wherein the corrugated member is a biodegradable composite, paper or cardboard.

12. The board of claim 3, wherein the corrugated member is configured to separate the first sheet from the second sheet by a minimum of about 2 mm and a maximum of about 20 mm.

* * * * *